Feb. 7, 1956  E. L. EVANS  2,733,823
EASY LAUNCH BOAT TRAILER
Filed Nov. 9, 1954  4 Sheets-Sheet 1
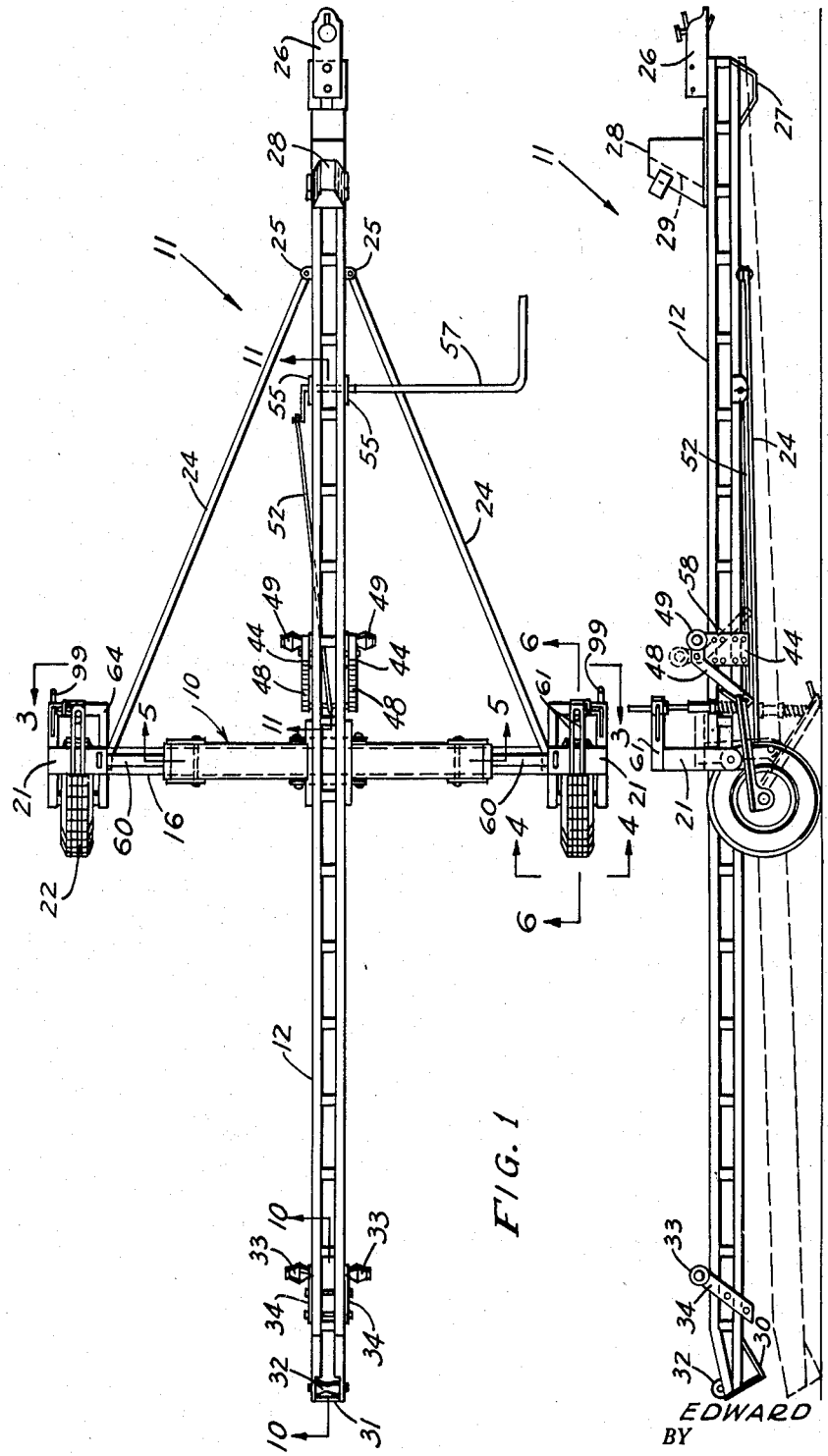
INVENTOR.
EDWARD L. EVANS
BY
McMorrow, Berman + Davidson
ATTORNEYS Feb. 7, 1956

E. L. EVANS 2,733,823

EASY LAUNCH BOAT TRAILER

Filed Nov. 9, 1954

INVENTOR.
EDWARD L. EVANS
BY
McMorrow, Berman + Davidson
ATTORNEYS

Feb. 7, 1956     E. L. EVANS     2,733,823
EASY LAUNCH BOAT TRAILER

Filed Nov. 9, 1954     4 Sheets-Sheet 3

INVENTOR.
EDWARD L. EVANS
BY
McMorrow, Berman & Davidson
ATTORNEYS

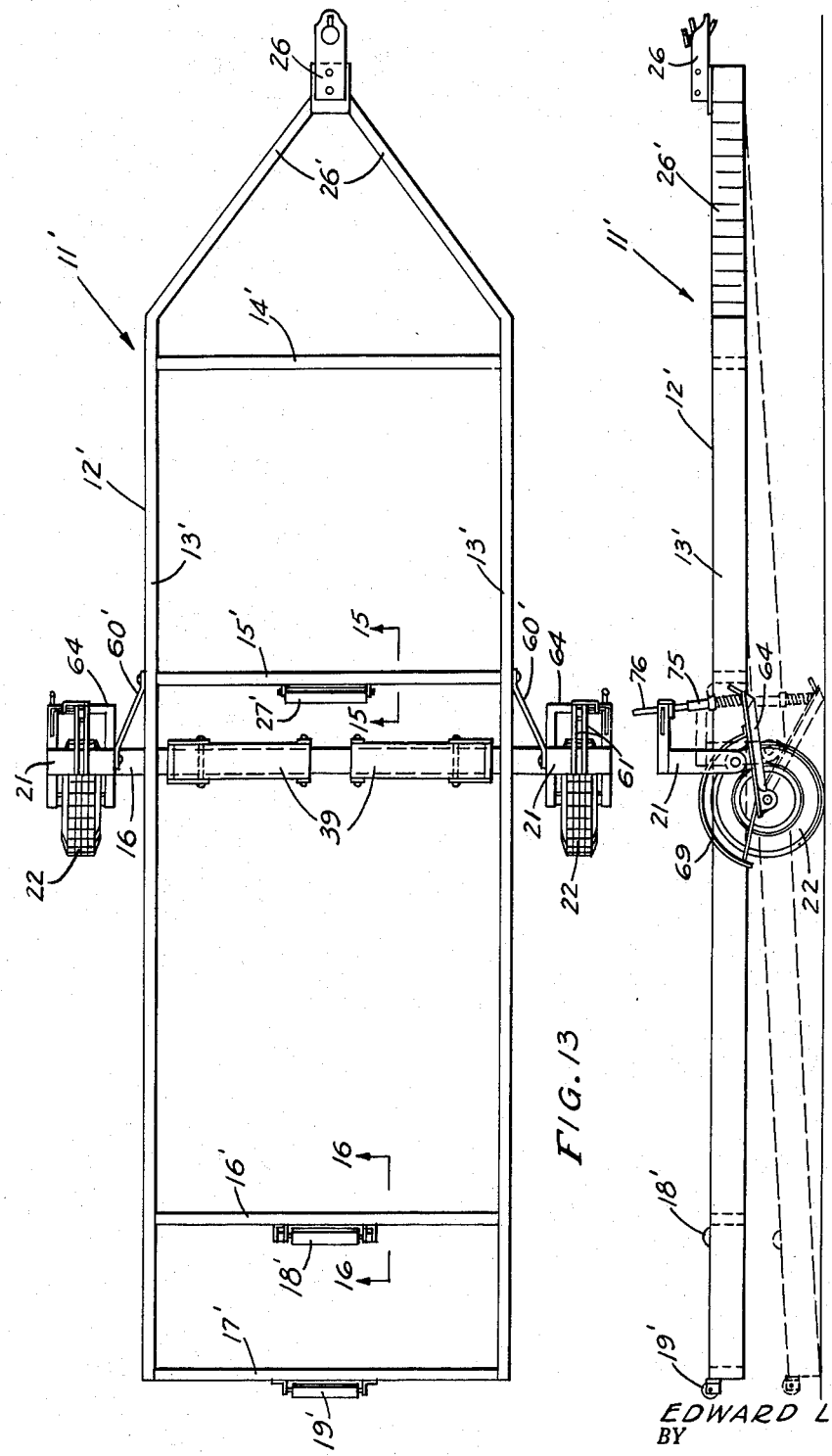

United States Patent Office 2,733,823
Patented Feb. 7, 1956

2,733,823

EASY LAUNCH BOAT TRAILER

Edward L. Evans, Eugene, Oreg.

Application November 9, 1954, Serial No. 467,669

2 Claims. (Cl. 214—505)

This invention relates to devices for transporting boats, and more particularly to an improved trailer adapted for use in hauling a boat.

A main object of the invention is to provide a novel and improved boat trailer which is simple in construction, which involves relatively few parts, and which is arranged so that a boat may be easily placed thereon and removed therefrom.

A further object of the invention is to provide an improved boat trailer which is inexpensive to fabricate, which is rugged in construction, which is arranged to securely support a boat for transportation, which is relatively light in weight so that it imposes a minimum amount of loading upon the vehicle hauling same, and which is provided with means for easily raising and lowering the frame thereof and for handling the boat, whereby the loading and unloading of the boat is greatly facilitated.

Further objects and advantages of the invention will become apparent from the following description and claims, and from the accompanying drawings, wherein:

Figure 1 is a top plan view of an improved boat trailer constructed in accordance with the present invention;

Figure 2 is a side elevational view of the boat trailer of Figure 1;

Figure 13 is a top plan view of a modified form of boat trailer constructed in accordance with the present invention;

Figure 14 is a side elevational view of the boat trailer of Figure 13;

Figure 5:
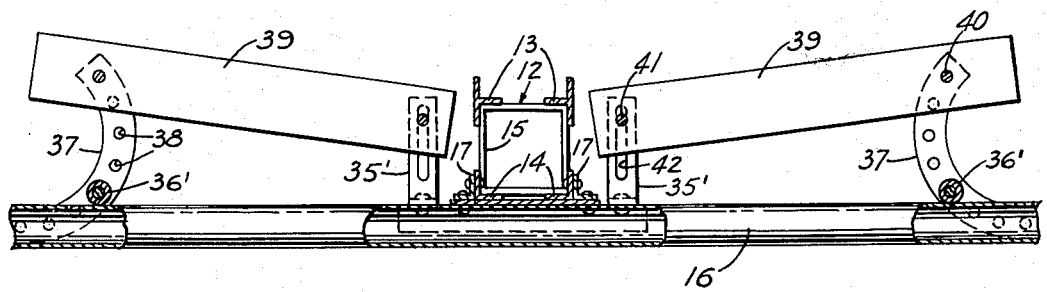
Figure 5 is an enlarged cross sectional view taken on line 5—5 of Figure 1.

Referring to the drawings, and more particularly to Figures 1 to 12, 11 designates generally an improved boat trailer according to this invention, said boat trailer comprising a longitudinally extending frame 12 to the intermediate portion of which is secured the transversely extending axle member 10. The frame 12 comprises a box-like, longitudinally extending beam structure comprising the top T-shaped bars 13, 13 and the bottom angle bars 14, 14 arranged longitudinally and secured to rectangular, longitudinally spaced ring members 15, as shown in Figure 5. The transversely extending axle member 10 comprises the transversely extending tubular member 16 which is secured at its intermediate portion to the lower bar members 14, 14 of the frame 12 by means of the angle brackets shown at 17, 17 in Figure 5. The tubular member 16 is rigidified by a truss rod 18 provided below said tubular member and secured at its ends to angle brackets 19, 19 in the manner shown in Figure 3, said angle brackets being located adjacent the opposite ends of the tubular member 16, and the truss rod 18 extending below an intermediate depending strut member 20 secured to the midpoint of the tubular member 16, thereby reinforcing the tubular member 16 against downward deflection.

Figures 3, 4:
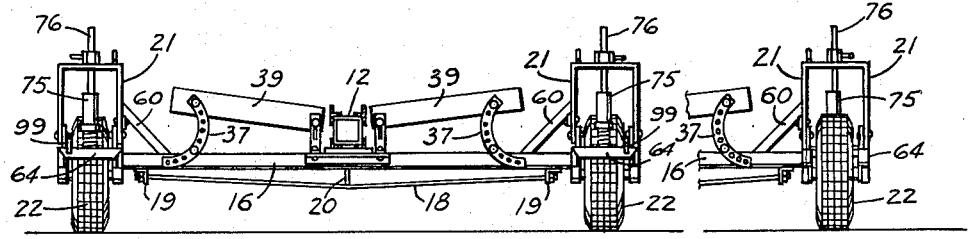
Figure 3 is a transverse vertical cross sectional view taken on line 3—3 of Figure 1.
Figure 4 is a fragmentary elevational detail view taken on line 4—4 of Figure 1.

Secured to the respective opposite ends of the tubular member 16 are the respective yoke members 21, 21, said yoke members being fabricated of channel iron, or the like, and having substantial rigidity. As shown in Figures 3 and 4, the yoke members 21 are adapted to receive the supporting wheels 22 of the boat trailer.

The opposite end portions of the axle member 16 are connected to the forward portion of the frame 12 by respective tie rods 24, 24 as shown in Figure 1, said tie rods being connected between the respective inside arms of the yoke members 21, 21 and respective apertured lugs 25, 25 provided on the respective opposite sides of the forward portion of frame 12.

Suitably secured to the forward end of the frame 12 is a conventional trailer hitch assembly 26 which may be secured in a conventional manner to the rear of the vehicle hauling the boat trailer. Secured to the underside of the forward end of the frame 12 is a skid member 27 which is employed to support the forward end of the frame when the hitch member 26 is detached from the hauling vehicle.

Secured on the forward end portion of frame 12 is the upstanding abutment member 28 which is provided with a recess 29 to receive the bow portion of a boat supported on the trailer, as will be presently described.

The rear end of the frame 12 is provided with the depending skid member 30 and is further provided with a yoke 31 in which is journaled a roller 32, said roller tapering inwardly in thickness, as shown in Figure 1, and being adapted to support the keel of a boat as the boat is being loaded onto the trailer, or as the boat is being removed therefrom.

Figure 10:
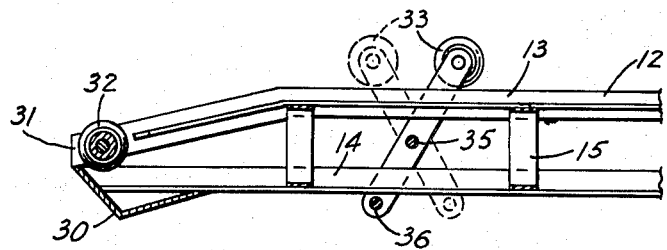
Figure 10 is an enlarged cross sectional detail view taken on line 10—10 of Figure 1.

Designated at 33, 33 are respective supporting rollers journaled on respective bracket bars 34, 34 adjustably secured to the rear portion of the frame 12. As shown in Figure 10, the bracket bars 34 may be fastened by respective transverse bolts 35 and 36, the bolt 35 extending through the frame and the bolt 36 extending below the bottom angle members 14, 14 of the frame, whereby the bars 34 may be rigidly secured by tightening the nuts provided on the bolts 35 and 36, thus clamping the bars 34, 34 in adjusted positions on frame 12. The rollers 33 are arranged to support the boat and to cooperate with the roller 32 when the boat is being loaded onto the trailer or is being removed therefrom. The position of the bars 34, 34 may be adjusted in accordance with the size and shape of the boat to be handled by the trailer.

Secured to the axle member 16 on opposite sides of and adjacent to the frame 12 are the upstanding slotted support bars 35', a pair of bars 35' being secured to the axle member on each side of the frame 12. Rotatably mounted on responsive pivot pins 36' suitably secured on the axle member 16 at substantial distances spaced outwardly from the bars 35' are the respective pairs of arcuate arms 37, 37 provided with spaced apertures 38 through which the pivot pins 36' may be arranged. Designated at 39, 39 are respective inclined, transversely extending supporting blocks having their outer end portions supported between the top portions of the bars 37, as by transverse bolts 40 extending through the blocks and through the respective pairs of bars 37, as shown in Figure 5. The inner end portions of the blocks 39 are supported on transverse bolts 41 extending through the slots 42 of the respective pairs of bars 35', 35', as shown. The angular inclination of the respective blocks 39, 39 may be adjusted in accordance with the shape of the bottom of the boat to be supported on the trailer by clamping the bolts 41 in selected positions in the slots 42 and by selecting suitable apertures 38 to receive the bolts 40 and the pivot pins 36', whereby the elevation of the supporting blocks both at the inner ends and the outer ends of the blocks 39 may be adjusted.

Secured to the respective opposite side portions of the frame 12 forwardly adjacent the transversely extending axle are the vertical plate members 44, 44, said plate members being adjustably secured to the frame. Thus, as shown in Figure 11, respective angle brackets 45 may be secured to the bottom portions of the frame on the opposite sides thereof, said angle brackets having depending flanges to which the plates 44 are secured, said plates being provided with spaced apertures 46 which may be selectively registered with similar apertures provided in the depending flanges of the angle brackets 45, whereby the plates 44 may be secured in adjustable vertical positions relative to the frame 12.

Figure 11:
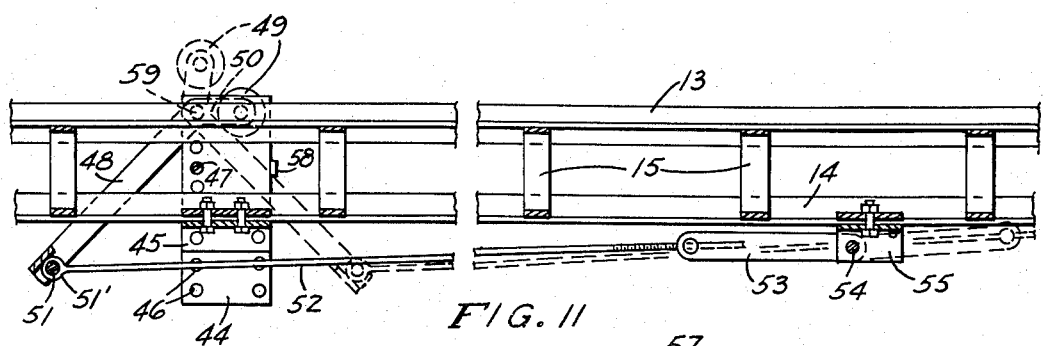
Figure 11 is an enlarged cross sectional detail view taken on line 11—11 of Figure 1.
Figure 12:
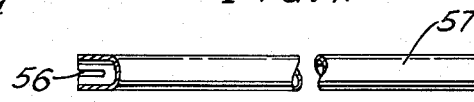
Figure 12 is a fragmentary elevational view, partly in cross section, of a detachable crank handle employed with the boat trailer shown in Figures 1 to 11.

The plates 44 may be connected together at their intermediate portions by transverse bolts 47, as shown in Figure 11.

Pivoted to the top portions of the respective plates, on the outer sides thereof with respect to frame 12, are the respective bell crank levers 48, respective rollers 49 being rotatably mounted on the short arms 50 of the levers 48 and projecting outwardly therefrom. The ends of the long arms of the levers 48 are connected together by a suitable steel transverse member 51 welded to arms 48 and connected to said member 51 by an eye 51' is a link rod 52 extending forwardly and connected at its forward end to a crank arm 53 secured to a transversely extending crank shaft 54 pivoted in depending bracket plates 55, 55 secured to the bottom portion of frame 12. Shaft 54 is provided on its end with suitable key means engageable by the notched end 56 of an L-shaped tubular crank handle 57, shown in Figure 12, which may be employed at times to rotate the shaft 54 and to thus rotate the bell crank levers 48. For example, the crank handle 57 may be employed to rotate the shaft 54 counterclockwise, as viewed in Figure 11, from the full line position thereof to the dotted view position thereof, whereby the rollers 49 are elevated from their depressed positions shown in full line view in Figure 11 to their elevated positions, shown in dotted view in said figure.

Suitable stop means is provided on one of the plates 44 adjacent each of the bell crank levers 48 to allow said levers to be rotated counterclockwise, as viewed in Figure 11, to positions wherein the short arms 50 of the levers are moved to upstanding positions, as shown in dotted line view in Figure 11. For example, stop pins 58, shown in Figure 2, may be provided on the respective plates 44 to limit counterclockwise rotation of the bell crank levers 48 to positions wherein the rollers 49 have been rotated counterclockwise from full line positions shown in Figure 2 to positions wherein they are just short of dead center with respect to the pivot bolts 59 of the bell crank levers. The crank arm 53, in this position, has been rotated past dead center with respect to shaft 54, which holds arms 50 in their elevated positions, for loading and unloading of boats.

Figure 6:
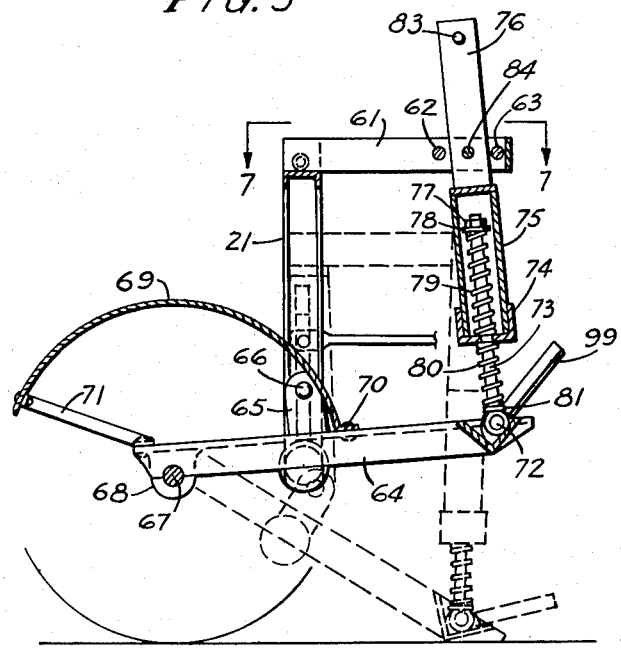
Figure 6 is an enlarged cross sectional detail view taken on line 6—6 of Figure 1.

The respective yoke members 21 at the opposite ends of the transversely extending axle member 16 are suitably braced to the axle member by inclined brace bars 60, 60, as shown in Figures 1, 3 and 4. Rigidly secured to the top of each yoke member 21 are a pair of forwardly extending bracket bars 61, 61. Extending through and secured to the forward end portions of each pair of bracket bars 61, 61 are the spaced transverse guide pins 62 and 63 defining a passageway therebetween. Designated at 64, 64 are respective U-shaped yoke members provided at the intermediate portions of their arms with upstanding apertured lugs 65 which are received inwardly adjacent to and are pivotally connected to the lower end portions of the respective arms of the yoke members 21. Thus, as shown in Figure 6, the lugs 65 are pivotally connected by pivot bolts 66 to the arms of the yoke members 21.

The respective wheels 22 are received in the U-shaped members 64 and are suitably journaled between the ends of the arms of said U-shaped members, the axles of the wheels, shown at 67 being rotatably received in suitable bearing elements 68 provided on the ends of the arms of the U-shaped member 64. The wheels may be provided with suitable fenders 69 having their forward end portions secured at 70 to the U-shaped members 64 and having their rear end portions supported by brackets 71 connected between the rear end portions of the fenders and the respective ends of the U-shaped member 64, as shown in Figure 6.

Pivotally connected at 72 to the bight portion of each U-shaped member 64 is an elongated bolt 73 which extends slidably through a central aperture provided in a cap member 74. The cap member 74 receives the lower end portion of a cylindrical housing member 75 to the top end of which is rigidly secured a flat bar element 76 which is slidably received between the bracket members 61, 61 and is guided for movement between said bracket members 61 by being engaged between the transverse guide bolts 62 and 63 of the bracket members. The upper portion of the elongated eye bolt 73 is received in the housing 75 and is provided with a washer 78 and nut 77, as shown in Figure 6. A coil spring 79 surrounds the upper portion of the bolt 73, bearing between the washer 78 and the cap member 74. Another coil spring 80 surrounds the lower portion of the bolt 73, bearing between the cap member 74 and a collar element 81 provided on the bolt member 73 adjacent the pivot connection 72. The springs 79 and 80 then cooperate to provide a resilient cushioned connection between the U-shaped member 64 and the member 76.

The flat bar member 76 is provided at its top end with a stop member, such as a stud 83 or the like, which limits downward removal of the bar member 76 from between the bracket bars 61, and prevents the bar member 76 from being disengaged from between the bracket bars 61, 61. The bar member 76 may be fastened to the bracket bars 61, 61 in an elevated position of the U-shaped member 64 by a transversely extending bolt member 84 slidably engaged through registering apertures in the bracket bars 61 and flat bar 76.

Figure 7:
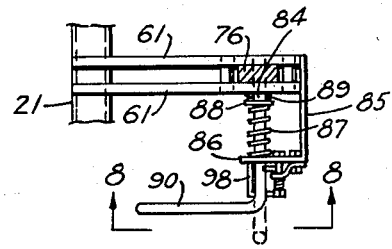
Figure 7 is a cross sectional detail view taken on line 7—7 of Figure 6.

As shown in Figure 7, an angle bracket 85 is secured to the ends of the bracket bars 61, 61 and has an end flange 86 extending parallel to said bracket bars and slidably receiving the bolt member 84. A coiled spring 87 surrounds the bolt member 84 and bears between the flange 86 and a collar 88 provided on the bolt member and anchored by a cotter pin 89, as shown in Figure 7. The coiled spring 87 thus biases the bolt member 84 inwardly toward the flat bar member 76 and acts to normally retain the bolt member 84 in a position such as that shown in Figure 6.

The bolt member 84 is provided with the outer right angled portion 90, and said bolt member is provided adjacent the handle portion 90 with an oppositely extending stud 91 which is received between the flange 86 and a locking plate 92 yieldably secured to the flange 86, or said bolt member may be provided with suitable locking means for lever portion 90. Thus, as shown in Figure 9, the locking plate 92 is movably fastened to the flange 86 by the respective supporting bolts 93 and 94, a coil spring 95 being provided on the outer portion of the bolt 94 bearing between a nut or similar abutment element 96 on the outer end of the bolt 94 and the plate 92, urging the plate against the stud 91. The locking plate 92 is channeled at 97 to receive the stud element 91 and to frictionally lock the stud in the position thereof shown in Figure 9, namely, in a position wherein the bolt member 84 cannot be retracted. However, the bolt 84 may be released by rotating the handle 90 approximately ninety degrees clockwise, as viewed in Figure 8, to the dotted view position shown in said figure, whereby the stud member 91 may be disengaged from the retaining plate 97, allowing the bolt 84 to be retracted and to be disengaged from the flat bar member 76.

Figure 8:
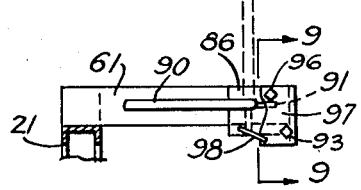
Figure 8 is a cross sectional detail view taken on line 8—8 of Figure 7.
Figure 9:
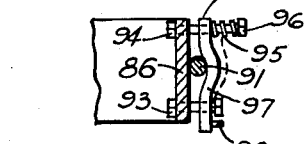
Figure 9 is an enlarged cross sectional detail view taken on line 9—9 of Figure 8.

The upper bolt 96 employed with the retaining plate 97 provides a stop means engageable by the stud member 91, limiting counterclockwise rotation of the handle 90, as shown in Figure 8. A U-shaped stop member 98 is secured to the flange 86 and is arranged to receive the stud element 91 when the handle 90 has been rotated clockwise from the full line position thereof in Figure 8 to the dotted view position thereof, the U-shaped member 98 having a bent bight portion which defines a loop against which the stud 91 is engageable and which serves as a stop means limiting rotation of the handle 90 in a clockwise direction to the dotted view position thereof shown in Figure 8. As is clearly shown in Figure 8, in the dotted view position of the handle 90, the stud member 91 is disengageable from the retaining plate 97 and is received in the bent loop portion of the stop member 98, sufficient clearance being provided in the stop member 98 to allow the handle 90 to be pulled outwardly to disengage the end of the bolt member 84 from the flat bar 76.

When the bar 76 is released, the U-shaped member 64 is foldable downwardly to the dotted view position thereof shown in Figure 6. Rigidly secured to the bight portion of the U-shaped member 64 is a rod element 99 on which a suitable tubular handle, for example, the crank handle 57 may be engaged, whereby to provide a handle for lowering or for elevating the U-shaped member 64.

As shown in Figure 2, the frame 12 may be thus lowered to the dotted view position thereof, whereby the boat to be transported may be lifted onto the frame or may be removed therefrom. In placing the boat on the trailer, the boat is first moved upwardly, being supported by the rollers 32, 33 and by the rollers 49 in their elevated positions, the boat being lowered onto the blocks 39, 39 by lowering the rollers 49 from their dotted view positions shown in Figure 11 to their full line positions of said figure. After the boat has been lowered onto the blocks 39, 39, the frame may be elevated to its full line position, shown in Figure 2, by employing a suitable handle in the sockets 99 to elevate the frame at one side thereof to a position wherein the bolt member 84 at said one side may be engaged in the locking aperture of the associated bar member 76, and to then elevate the frame at the opposite side thereof to a position wherein the associated bolt 84 at said opposite side may engage in the locking aperture of the corresponding bar member 76.

In unloading the boat a reverse procedure is followed. Thus, the frame is lowered to the dotted view position thereof of Figure 2, employing the handle 57 with the sockets 99 first at one side of the trailer and then at the other, and by releasing the bolt 84 at each side in order to lower said side. After the frame has been lowered to the dotted view position of Figure 2, the handle 57 is employed to rotate the rollers 49 to their elevated positions, lifting the boat off the blocks 39, 39 and allowing the boat to be slid rearwardly from the trailer.

Figures 15, 16:
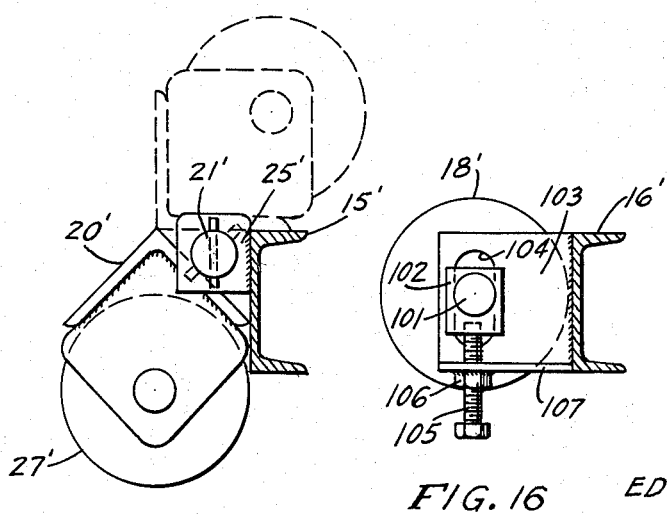
Figure 15 is an enlarged cross sectional detail view taken on line 15—15 of Figure 13.
Figure 16 is an enlarged cross sectional detail view taken on line 16—16 of Figure 13.

Referring to the modification of the invention shown in Figures 13, 14 and 15, the trailer is designated generally at 11'. The trailer comprises a generally rectangular frame 12' having the longitudinal side bars 13' which are connected by transverse bar members 14', 15', 16' and 17', as shown. The forward end of the frame 12' comprises the forwardly convergent hitch members 26' to which the conventional trailer hitch unit 26 is secured.

Suitable boat-supporting rollers 27', 18' and 19' are rotatably mounted on the intermediate portions of the transversely extending frame members 15', 16' and 17', as shown.

The transverse axle member 16, similar to that employed in the form of the invention previously described is secured transversely to the intermediate portions of the side bars 13' of the frame 12', and the yoke members 21 are braced to the frame by inclined brace bars 60' connected between the inside arms of the yoke members and the longitudinal side bars 13' of the frame, as shown.

As shown in Figure 16, suitable means is provided for adjusting the roller 18' vertically for supporting different types of boats. Thus the roller shaft, shown at 101 may be journalled in bearing blocks 102 which are slidably disposed outwardly adjacent respective bracket plates 103 welded to cross bar 16', the shaft ends extending slidably through vertical slots 104 in the plates 103. Vertical adjusting screws 105 are threaded through respective horizontal nuts 106 welded to horizontal flanges 107 on the bottom edges of plates 103, said screws being rotatably received in bottom recesses provided in the blocks 102, whereby the blocks 102 may be vertically adjusted by rotating the screws 105.

Suitable means may be provided for raising and lowering the roller 27' at times to facilitate loading and unloading of the boat onto the trailer. For example, the roller 18' may be mounted in a bracket member 20' which is hinged to the transverse frame member 15' by a transversely extending shaft 21'.

As shown in Figure 15, stationary hinge elements 25' are secured to the corner portions of the cross member 15' and the movable portion, namely, the bracket 20' is pivotally connected to the stationary hinge portions 25' by the shaft 21' which is laterally offset outwardly from the aforesaid top corner portions of the channel bar 15'. The hinge shaft 21' is rigidly connected in any suitable manner to the bracket portion 20', and said hinge shaft is provided with a suitable key element at its end adapted to lockingly interengage with the notched end portion 56 of a suitable handle bar 57, such as that shown in Figure 12. Thus, by use of a handle bar 57, the roller 27' may be rotated from a lowered position, such as that shown in full line view in Figure 15, to an elevated position, such as that shown in dotted view in said figure, whereby the boat may be elevated from the block members 39, 39, when it is desired to unload the boat from the trailer with the frame of the trailer in the lower dotted view position thereof shown in Figure 14. Similarly, in loading the boat on the trailer, the roller 27' may be in its elevated position, allowing the boat to be moved onto the trailer to a position above the block members 39, after which the roller 27' may be lowered to its full line position, shown in Figure 15, whereby the boat is lowered onto the block members 39, 39. After the boat has been thus placed on the frame, the frame may be raised from its dotted line position to its full line position in Figure 14 by employing the method described above in connection with the previously disclosed form of the invention, namely, by first elevating the frame on one side thereof and locking the bar member 76 at said one side by means of an associated locking bolt 84, and then by following the same procedure on the other side of the frame.

The trailers above described may be employed for uses other than carrying boats. A suitable box may be mounted on the trailer frame to convert same to a light utility trailer for carrying objects other than boats. The box may be suitably fastened to the axles and to the other trailer frame members to secure the box to the body of the trailer.

While certain specific embodiments of an improved boat trailer have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a boat trailer, a frame, hitch means on the forward end of the frame for connecting the frame to a vehicle, a transversely extending axle member secured to the intermediate portion of said frame, bracket means on the ends of said axle member, respective wheel yokes pivotally connected to the respective ends of the axle member, respective wheels journaled in said wheel yokes at locations spaced from the pivotal connections of said yokes to the frame, respective upstanding stem elements pivotally connected to said yokes at locations spaced from the pivotal connections of the yokes to said frame, respective upstanding stem elements on said yokes slidably engaged with said bracket means, spring means yieldably connecting said stem elements to the yokes at locations spaced from the pivotal connections of the yokes to the frame, respective retractible locking means extending through and releasably connecting said stem elements to said bracket means, whereby said frame may be lowered when said locking means are retracted, a plurality of pairs of support elements mounted at longitudinally spaced locations on said frame on opposite sides of the longitudinal center line of said frame and being arranged to support a boat longitudinally on said frame, and means for at times elevating one of said pairs of support elements relative to said frame.

2. In a boat trailer, a frame, hitch means on the forward end of said frame for connecting the frame to a vehicle, a transversely extending axle member secured to the intermediate portion of said frame, bracket means on the ends of said axle member, respective wheel yokes pivotally connected to the respective ends of the axle member, respective wheels journaled in said wheel yokes at locations spaced from the pivotal connections of said yokes to the frame, respective upstanding stem elements on said yokes slidably engaged with said bracket means, spring means yieldably connecting said stem elements to the yokes at locations spaced from the pivotal connections of the yokes to said frame, respective retractible locking means extending through and releasably connecting said stem elements to said bracket means, whereby said frame may be lowered when said locking means are retracted, a first pair of boat-supporting rollers journaled to said frame adjacent the rear ends of the frame, a roller support member pivoted to the frame at a portion of said frame spaced a substantial distance forwardly from said first pair of boat-supporting rollers, a second pair of boat-supporting rollers journaled on said roller support member, said rollers being arranged to support a boat longitudinally on said frame, crank means on said frame connected to said roller support member, and means arranged to at times support said roller support member in an upstanding position relative to said frame.

References Cited in the file of this patent

UNITED STATES PATENTS

| | | |
|---|---|---|
| 1,052,189 | Thornley | Feb. 4, 1913 |
| 1,603,821 | Watters | Oct. 19, 1926 |
| 2,453,388 | Schramm | Nov. 9, 1948 |
| 2,487,701 | Getz | Nov. 8, 1949 |
| 2,496,599 | Rivers | Feb. 7, 1950 |
| 2,691,534 | Sampsell | Oct. 12, 1954 |